Aug. 6, 1946. W. B. EWING 2,405,197
MACHINE FOR MAKING SUN SCREENS
Filed May 26, 1943 9 Sheets-Sheet 1

*INVENTOR.*
WALKLEY B. EWING
BY
ATTORNEYS

Aug. 6, 1946.   W. B. EWING   2,405,197
MACHINE FOR MAKING SUN SCREENS
Filed May 26, 1943   9 Sheets-Sheet 4

INVENTOR
WALKLEY B. EWING
BY
ATTORNEYS

INVENTOR.
WALKLEY B. EWING
BY
ATTORNEYS

Aug. 6, 1946.  W. B. EWING  2,405,197
MACHINE FOR MAKING SUN SCREENS
Filed May 26, 1943  9 Sheets-Sheet 6

INVENTOR
WALKLEY B. EWING
BY
ATTORNEYS

Aug. 6, 1946.   W. B. EWING   2,405,197
MACHINE FOR MAKING SUN SCREENS
Filed May 26, 1943   9 Sheets-Sheet 9

*INVENTOR.*
WALKLEY B. EWING
BY
ATTORNEYS

Patented Aug. 6, 1946

2,405,197

UNITED STATES PATENT OFFICE 2,405,197

MACHINE FOR MAKING SUN SCREENS

Walkley B. Ewing, Frankfort, Mich., assignor to Ewing Development Company, Bay City, Mich., a corporation of Michigan Application May 26, 1943, Serial No. 488,611

16 Claims. (Cl. 164—6.5)

This invention relates generally to machines for making sun screens and refers more particularly to machines for making sun screens of the Venetian blind type.

One of the essential objects of the invention is to provide a machine capable of slitting and folding sheet material to provide a sun screen which, without adjustment, will be effective in excluding the direct rays of the sun both when the sun is at a high altitude and an azimuthal angle roughly normal to the shade and when the sun is nearly on the horizon and at an oblique angle to the screen, and which at the same time will permit materially greater vision directly through the screen than do most conventional screens of the type mentioned.

Another object is to provide a machine capable of readily and inexpensively fabricating the sun screen from a single piece of sheet material.

Another object is to provide a machine capable of producing a sun screen consisting essentially of a plurality of parallel strips or louvers inclined to the general plane of the screen and spaced at intervals not greatly exceeding the width of a strip, and spaced parallel legs inclined to the general plane of the screen and interconnecting the strips at intervals along the lengths thereof. Preferably the machine is capable of making a sun screen wherein the strips extend horizontally across the screen in a single plane and are offset at regular intervals along their lengths, and the legs interconnect the strips at the offsets thereof.

Another object is to provide a machine having means for initially forming in and preferably on the bias to an edge of a sheet substantially rhomboidal in shape a plurality of like parallel series of parallel regularly offset overlapping slits to define a plurality of parallel continuous regularly offset strip members interconnected at their corresponding oppositely offset portions by leg members.

Another object is to provide a machine having means for transforming the slitted blank into a sun screen by successively displacing each strip member diagonally downward and backward in the bias direction to force the strips into substantially parallel planes and to cause the leg members to become inclined to the strip members and to the general plane of the resulting screen.

Another object is to provide a machine wherein the means for slitting the sheet material is operable also for slightly preforming the strip members before they are displaced as aforesaid.

Another object is to provide a machine wherein the means for displacing the strip members as aforesaid is essentially a folder which preferably accomplishes the operation by a rotary movement thereof.

Another object is to provide a machine wherein both the reciprocating movement and rotary movement mentioned are simultaneously performed at different stations by a common actuator so that one slitting operation is performed and one completed louver is obtained during each downward stroke of the common actuator. Preferably the rotary motion for the folding operation is translated by means of a yoke into a reciprocating movement for the slitting operation.

Another object is to provide a machine wherein the lineal production of the screen is exactly the same as the lineal feed but the finished screen is slightly wider. Preferably the rhomboidal sheet material or blank is transformed into a substantially rectangular screen having a slightly greater area than the blank.

Another object is to provide a machine having means for providing precise control of the angular disposition of the formed elements of the sheet material, particularly of the strip members or louvers to provide the specifically desired sun excluding or shading properties or characteristics.

Another object is to provide a machine wherein the means for slitting and folding the sheet material as aforesaid are preferably in the form of die members which in reality are half punch and half die and capable of accurately shaping the material as desired.

Another object is to provide a machine wherein each slitting element of the cooperating punch and die assemblies have two cutting edges and are reversible so that such edges may be alternately used to give the slitting elements double life.

Another object is to provide a machine having an automatic stock feeding means capable of accurately feeding or advancing the stock or sheet material in fast short strokes through the machine. Preferably each successive feeding stroke is .0147 of an inch, and such strokes occur at the rate of 300 per minute. Such feeding is regular so as to obtain ⅛" louver width desired.

Another object is to provide a machine wherein the angle of feed of the blank, the angle of slits therein, the angle of fold, the length of the strip and leg members, and the number of degrees of rotation given to the common oscillating actuator for the slitting and folding means are all precisely controlled so that the maximum regularity is obtained, together with the maximum control of the disposition of the material.

Other objects, advantages and novel details of construction of this invention will be made more apparent as this description proceeds, especially when considered in connection with the accompanying drawings, wherein:

Figure 28 is a plan view of the working edge of the spacer illustrated in Figures 26 and 27;

Figures 35, 36, 37, 38:
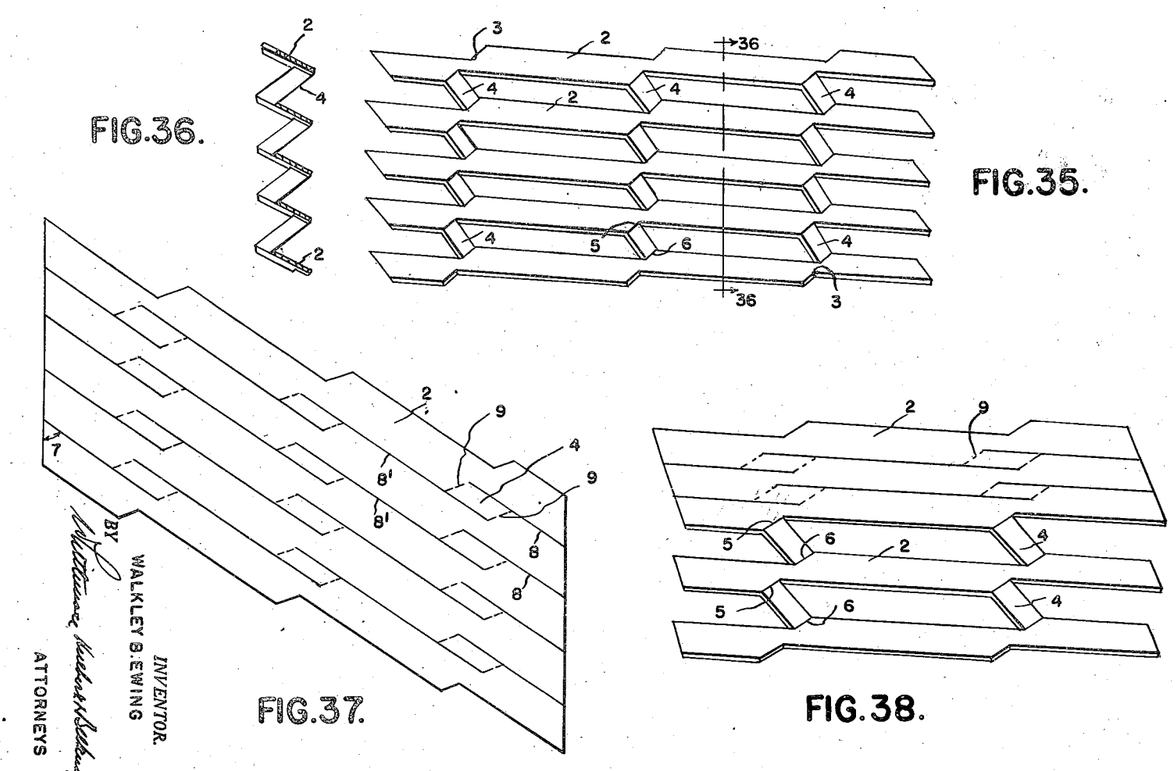
Figure 35 is an enlarged front elevation of a small portion of a preferred form of sun screen made by the machine.
Figure 36 is a cross section taken on the line 36—36 of Figure 35.
Figure 37 is an enlarged plan view of a portion of a slitted blank used in making the sun screen illustrated in Figures 35 and 36.
Figure 38 is a perspective view showing the blank of Figure 37 partially folded into the screen structure illustrated in Figures 35 and 36.

The sun screen produced by a machine embodying my invention is formed by slitting and folding a single sheet of material and consists of a series of parallel strips 2 of elongated cross section which are vertically superposed at equal intervals not greatly exceeding, and preferably approximately equal to, the width of a strip, and are inclined, preferably at least 45°, and perhaps as much as 75°, to the general plane of the screen, i. e. to the vertical.

As shown, each individual strip 2 extends horizontally across the screen and lies in a single plane. Preferably each strip 2 is offset regularly in the same direction at equal intervals along its length, as at 3, the distance of offset not exceeding about three-fourths the width of the strip, and being advantageously about one-half such width. The strips 2 are joined together by vertical rows of legs 4 formed of sheet material integral with that of the strips, each leg having a width substantially equal to the regular offset distance of each strip, i. e. not greater than about three-fourths the width of a strip, and connecting a front portion 5 of a strip with the corresponding oppositely offset rear edge 6 of an adjacent strip. The rows of legs 4 are ordinarily spaced apart a distance large in comparison to the intervals between adjacent strips. As will be seen from the drawings, the legs 4 are inclined to the general plane of the screen, and are also rather sharply inclined to the strips to which they are attached. The legs in any given row are ordinarily in the same or in parallel vertical planes, and preferably have their centers all in the same vertical line, in order to give a generally rectangular appearance to the screen.

While the sun screen is illustrated with only two offsets per strip and two rows of legs, it will be appreciated that it may comprise any number of offsets and corresponding rows of legs, to form a screen of the desired dimensions. In general, the width of a strip will be from one-eighth to one-half inch, and the distance between rows of legs one-half to five inches, although other sizes are equally possible. The screen is usually fabricated of thin sheet metal, but may also be formed of other flexible, strong materials, such as synthetic plastic sheet.

For the purpose of definition, the sun screen may also be considered as comprising a plurality of parallel vertically superposed horizontally extending series of strip elements, the individual elements of each horizontal series being inclined to the general plane of the screen and to the horizontal and being interconnected in offset relation, and leg members connecting the strip elements of each horizontal series with the corresponding elements of an adjacent horizontal series. In this concept, the individual elements of each horizontal series of strip elements are preferably interconnected by offset members in such manner that the said elements and said offset members together constitute a single integral strip lying in one plane.

In making the sun screen of the invention, the sheet material or blank from which the screen is to be fabricated is first preferably slit and is then formed into the screen. Preferably this blank comprises a sheet substantially rhomboidal in shape and having therein on the bias to an edge thereof a plurality of like parallel series of parallel regularly offset overlapping slits, said slitted sheet thus defining a plurality of parallel continuous regularly offset strip members interconnected at their corresponding oppositely offset portions by leg members.

As shown in Figure 37 the parallel slits are all disposed at a bias angle 7, determined as hereinafter explained, and are arranged in a plurality of like parallel series, as at 8 and 8'. The individual lines within a series are regularly offset a distance which does not exceed about three-fourths the distance between corresponding lines of adjacent series, and overlap at their offset positions a distance which does not greatly exceed, and need not equal, the distance between corresponding lines of adjacent series. As a result of this slitting, there are formed parallel continuous regularly offset strip members 2 interconnected at their corresponding oppositely offset portions by leg members 4.

The blank slitted as described is formed into a sun screen by successively displacing each strip member diagonally downward and backward in the bias direction to force the strips into substantially parallel planes and to cause the leg members to become inclined to the strips and to the general plane of the resulting screen. A partially folded blank showing two of the strip members already displaced into position is illustrated in Figure 38.

The displacement of the strip members 2 and the concurrent formation of the legs 4, may be rendered more accurate by defining on the blank fold lines 9 to mark the point of juncture of the leg members 4 with the strips 2, either by suitably crimping the blank or by other means. The fold lines 9 are ordinarily oblique to the long edges of the strips 2 and are preferably in the same or parallel planes.

The angle at which the strips 2 are inclined to the general plane of the screen is controlled by three factors, i. e. the angle of the fold lines, the bias angle 7, and the degree of fold imparted to the leg members 4. In making the screen, these angles and the various dimensions of the strips 2 and leg members 4 are chosen so that, in the final screen, the strips 2 have an inclination capable of providing the desired protection from direct sunlight. The precise choice of these angles and dimensions is made from mathematical formulas which have been developed from the geometry of the screen and the blank.

The screen may be fabricated by extremely simple means from a single sheet of material, and can be made in any desired size. The metal in the screen is not under stress, having been merely folded into position. The structure presents only smooth, flat surfaces, and hence collects little dust or dirt, and can be easily cleaned. If desired, it may be rolled up for shipping.

Figures 1, 2, 3:
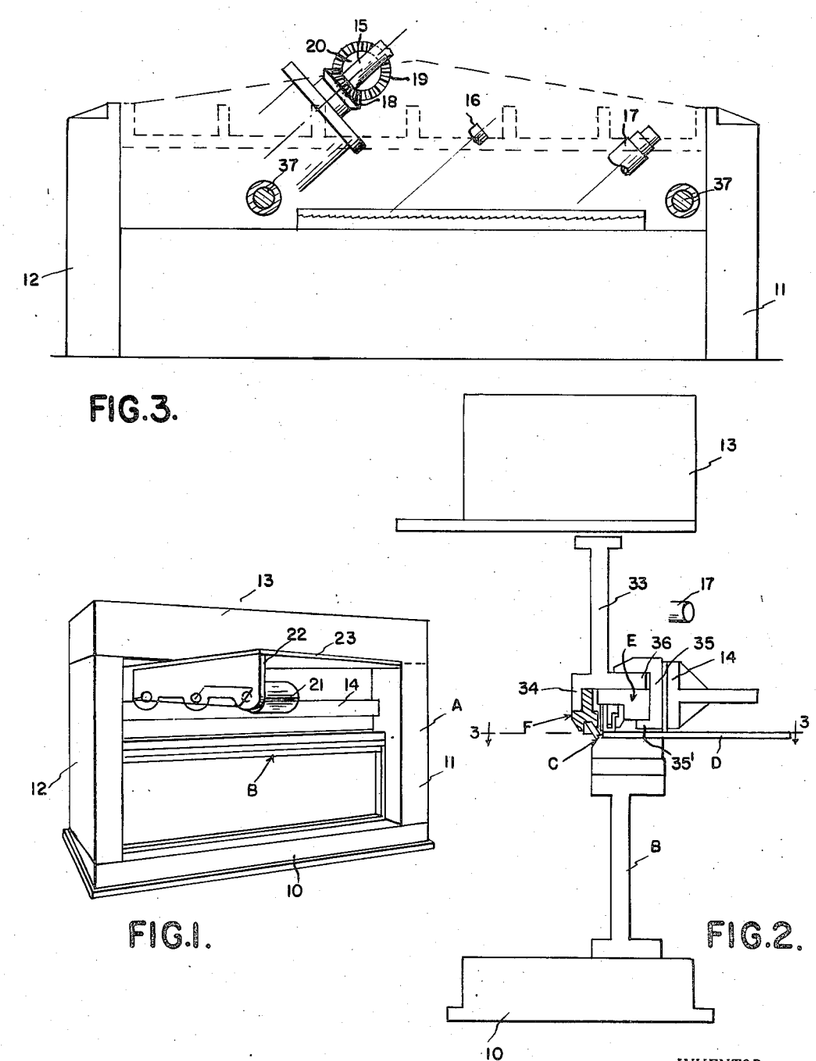
Figure 1 is a perspective view of the main frame of the machine, with a schematic assembly of the drive shaft, two eccentric shafts and connectors upon the supports therefor carried by said frame.
Figure 2 is a vertical sectional view through the machine at the center line thereof, with parts in elevation.
Figure 3 is a horizontal sectional view taken on the line 3—3 of Figure 2.

Referring now to the machine for making the sun screen, A is the main frame having a base 10, uprights 11 and 12 respectively at opposite ends of the base, and a top 13 mounted upon the uprights. B is an auxiliary frame mounted within the main frame A at the bottom thereof and constituting a support for a die assembly C and feed bed D; and 14 is a horizontally disposed T-beam extending between and terminally secured to the uprights 11 and 12 of the main frame in upwardly and rearwardly offset relation to the auxiliary frame B.

15, 16 and 17 respectively are parallel horizontal shafts disposed obliquely to the longitudinal median line of the main frame and supported from the top 13 thereof, 18 is a bevel gear on the shaft 15 and meshing with a bevel gear 19 on a vertical shaft 20 which in turn is operatively connected to a motor (not shown) or other suitable power plant upon the top 13 of the frame. Preferably the shafts 15, 16 and 17 respectively are mounted in suitable bearings within sleeves 21 suspended by a bracket 22 from a plate 23 rigidly secured to the underside of the top 13 of the frame.

In the present instance the shaft 15 is a rotating shaft, while the shafts 16 and 17 respectively merely oscillate and are driven in unison from the shaft 15. As shown, a double crank arm 24 is carried by the shaft 17 and is connected by rods 25 and 26 respectively to cranks 27 and 28 respectively carried by the shafts 15 and 16. Thus, rotary movement of the shaft 15 will be translated by the crank 27, rod 25 and crank 24 into oscillating movement for the shaft 17, and such oscillating movement of shaft 17 will be transmitted by the rod 26 and crank 28 to the shaft 16 so that both shafts 16 and 17 will oscillate in unison.

Preferably the shafts 16 and 17 have eccentric portions 29 and 30 respectively carrying bearings for tubular sleeves 31 and 32 respectively from which a vertical I-beam 33 is suspended in substantially vertical alignment with the auxiliary frame B for actuating simultaneously a slitter punch assembly E and a folder punch assembly F relative to the die assembly C.

The punch assembly E reciprocates vertically relative to the die assembly C to provide slits such as 8, 8' in the sheet material, while the folder punch assembly F oscillates relative to the die assembly C to fold portions of the sheet material beside the slits into louvers and interconnecting legs such as 2 and 4 respectively.

Figures 19, 20, 21:
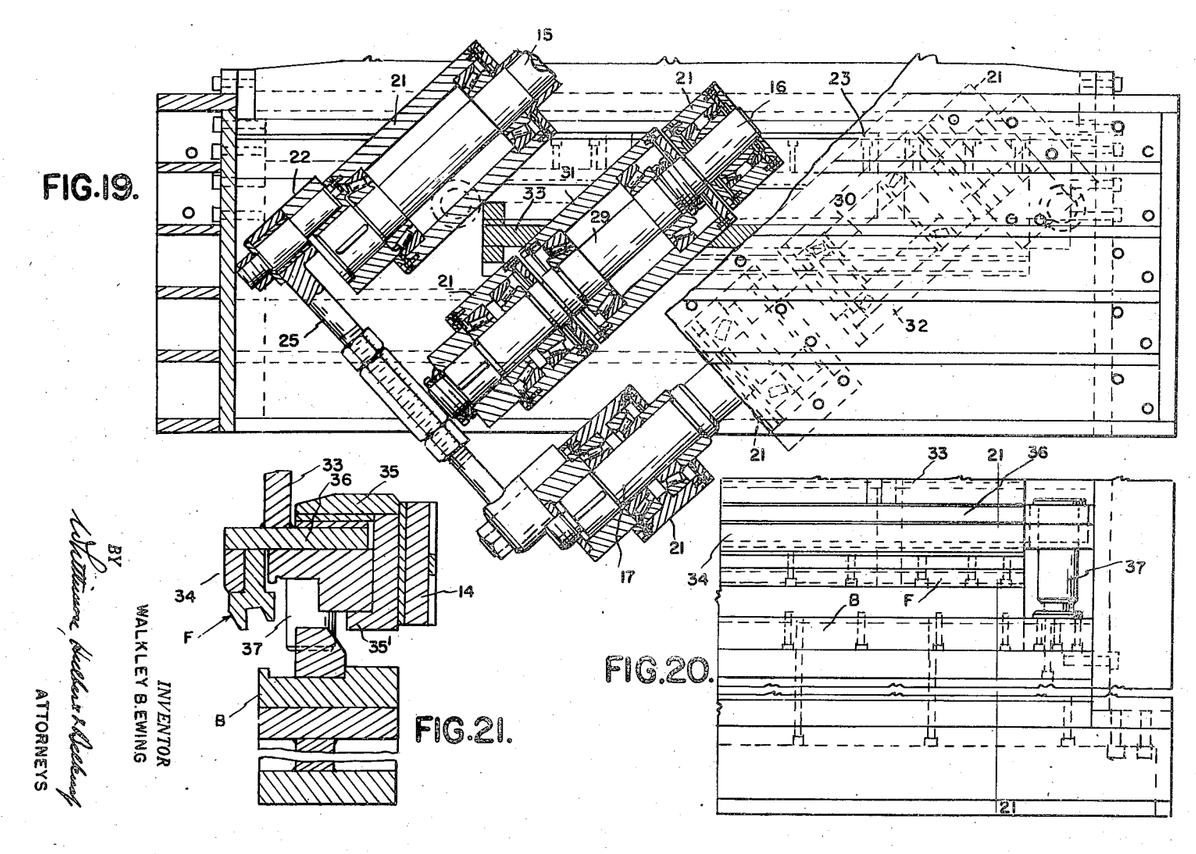
Figure 19 is a horizontal sectional view taken on the line 19—19 of Figure 18.
Figure 20 is a fragmentary front elevation of the upright beam, folder punch holder, guide pin and die holder assembly.
Figure 21 is a vertical sectional view taken on line 21—21 of Figure 20.

The folder punch assembly F is beside but separate from the punch assembly E and is secured to a depending leg or flange 34 of the I-beam 33 so as to oscillate in unison therewith as such beam is actuated by the eccentrics 29 and 30 of the shafts 16 and 17. A yoke 35 straddles the punch assembly E and the base 36 of the I-beam 33 and cooperates with said base for translating the oscillating movement of the I-beam into a vertical reciprocating movement for the punch assembly E. In this connection it will be noted that the yoke 35 is guided vertically by the head of the T-beam 14 carried by the main frame and that the punch assembly E is guided vertically by means of pins 37 mounted upon the auxiliary frame B.

Figures 4, 4A, 5, 6, 7, 8:
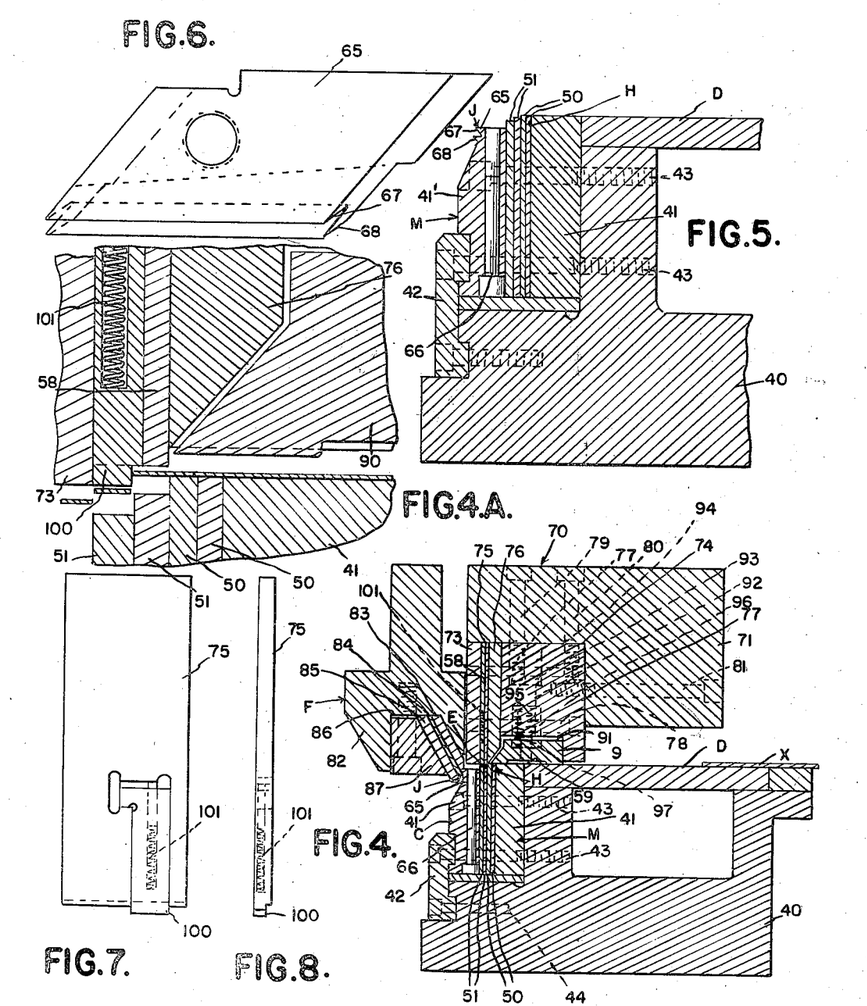
Figure 4 is a vertical sectional view through the slitter and folder punch and die assemblies.
Figure 4A is an enlarged fragmentary vertical sectional view through the slitter punch assembly and cooperating die assembly when the punch assembly is in fully raised position, with the stripper bar in raised position to permit advancement of the sheet material, and the spring pressed insert in lowered position to limit such advancement.
Figure 5 is an enlarged vertical sectional view through the slitter and folder die assemblies.
Figure 6 is a top plan view of one of the folder die elements.
Figure 7 is a detail elevational view of one of the spacers in the slitter punch assembly.
Figure 8 is an edge elevation of the spacer illustrated in Figure 7.
Figure 9:
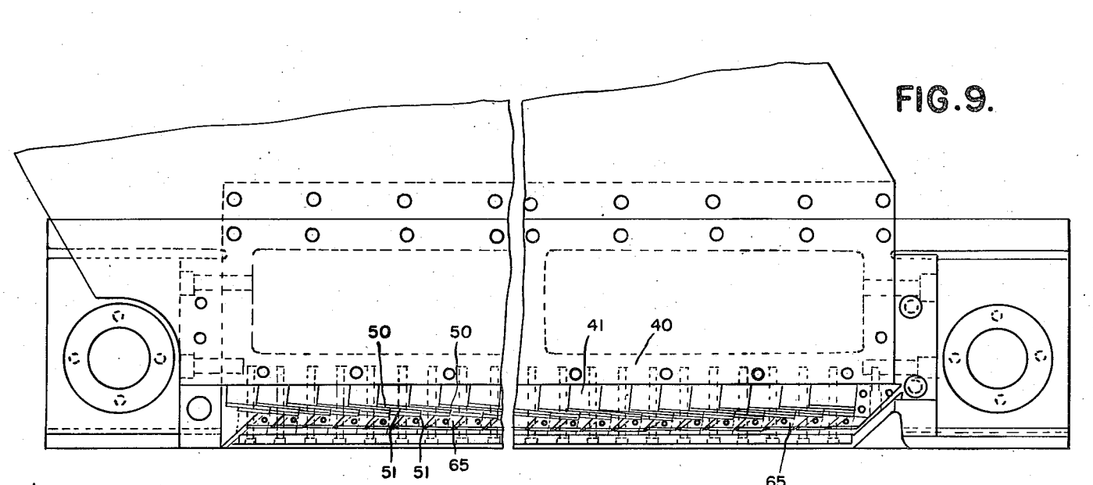
Figure 9 is a fragmentary plan view of the folder die assembly.

The die assembly C has a base 40 mounted upon the auxiliary frame B beneath the feed bed D and includes a slitter die H and a folder die J. Preferably the slitter die H is clamped between sections 41 and 41' of a suitable holder M on the base 40 at the inner end of the feed bed D, while the folder die J is anchored upon the outer section 41' of the holder for the slitter die H. Any suitable means such as a clamp 42 and bolts 43 and 44 respectively may be employed to fasten the holder sections 41, 41' to the base 40.

The slitter die H has a series of plate-like blades 50 disposed in overlapping staggered parallel relation to each other and has a pair of plate-like spacers 51 beside each of said blades. As shown, the blades 50 and spacers 51 are substantially rectangular in configuration and are arranged in upright position. The upper ends of the blades 50 have straight flat portions 52 simulating parallelograms in configuration and are provided beyond opposite ends of said flat portions with beveled or downwardly and outwardly inclined portions 53. Opposite side edges 54 and 55 respectively of the blades are cutting or shearing edges and are adapted, when the blades are reversed, to be used alternately with complementary cutting edges 56 and 57 respectively of reversible punch blades 58 to provide the slits 8 and 8' in the sheet material or blank as illustrated in Figure 37.

Figures 22, 25:
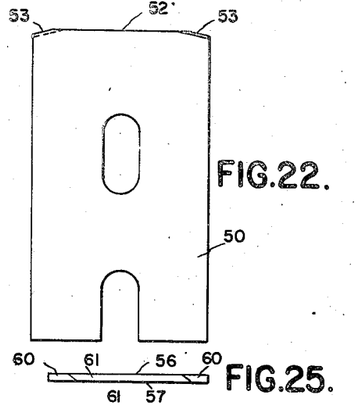
Figure 22 is an elevational view of one of the die blades.
Figure 25 is a plan view of the working edge of the blade illustrated in Figure 24.
Figure 23:
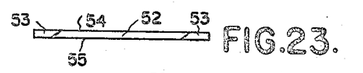
Figure 23 is a plan view of the working edge of the blade illustrated in Figure 22.
Figures 24, 26:
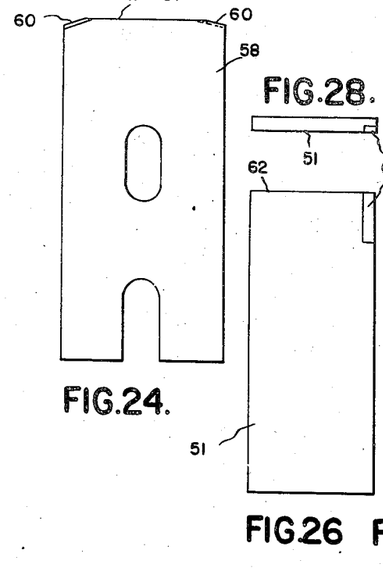
Figure 24 is an elevational view of one of the punch blades.
Figure 26 is an elevational view of one of the die spacers.
Figures 27, 32:
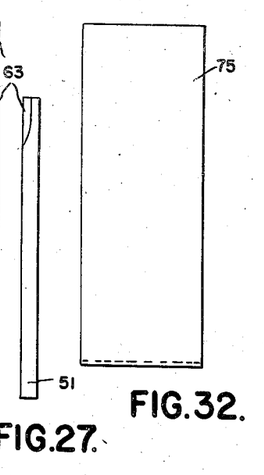
Figure 27 is an edge view of the spacer illustrated in Figure 26.
Figure 32 is an elevational view of one of the punch spacers.
Figures 29, 30, 31:
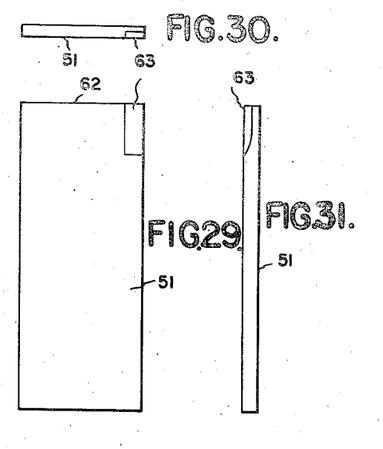
Figure 29 is an elevational view of another of the die spacers.
Figure 30 is an edge view of the spacer illustrated in Figure 29.
Figure 31 is a plan view of the working edge of the spacer illustrated in Figures 29 and 30.
Figure 33:
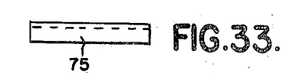
Figure 33 is an edge view of the spacer illustrated in Figure 32.
Figure 34:
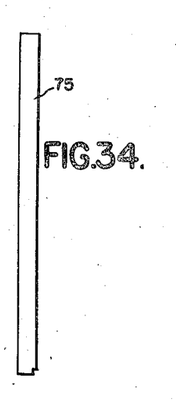
Figure 34 is a plan view of the working edge of the spacer illustrated in Figures 32 and 33.

When the blades 50 are assembled in their holder, the working upper ends of the blades 50 are substantially flush with the upper surface 59 of their holder M, hence the outermost cutting edge only of each blade 50 is available for slitting purposes. Likewise, the arrangement is such that only one beveled portion 53 of each blade 50, preferably the beveled portion in advance of the available cutting edge, is usable with a complementary portion 60 of a punch blade 58 to slightly preform the louvers 4 of the screen during the slitting operation. Between the beveled portions 60 at the upper ends of the punch blades 58 are portions 61 that are flat and simulate parallelograms in configuration.

The upper ends 62 of the spacers 51 are flat and are preferably arranged in stepped relation to each other and to the upper ends of the slitter blades 50. Such spacers 51 are also provided at one upright edge thereof with vertically extending recesses 63.

The folder die J comprises a series of block-like members 65 which are anchored by bolts 66 upon the outer sections 41' of the die holders M in stepped relation to the spacers 51, and are provided at their outer edges with stepped undercut portions 67 and 68 respectively. As shown, the block-like die members 65 are arranged in edge to edge relation with the stepped undercut portions 67 and 68 of the respective members disposed successively in outwardly offset relation to each other. In this connection it will be noted that the abutting edges of the block-like members 65 are beveled so as to overlap each other and thereby cooperate with the bolts 66 to hold such members down on the holder M.

Figure 10:
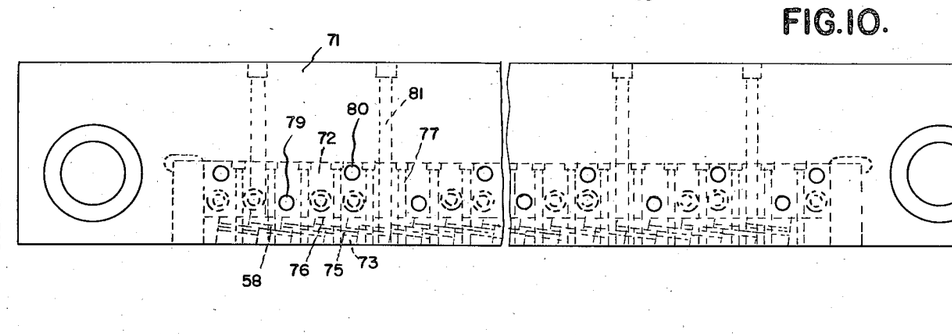
Figure 10 is a fragmentary plan view of the punch assembly.
Figure 11:
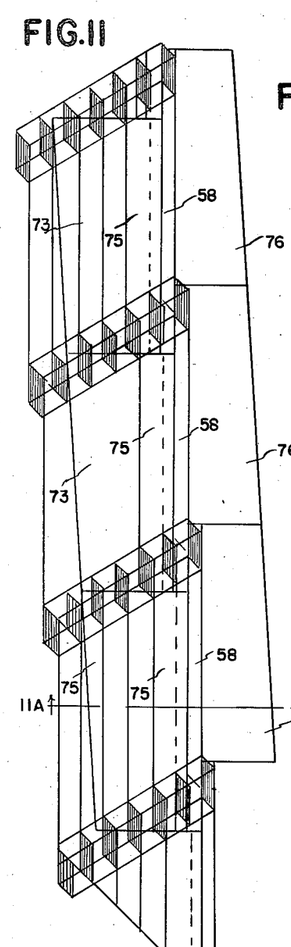
Figure 11 is an enlarged fragmentary plan view of the slitter punch assembly.
Figure 11A:
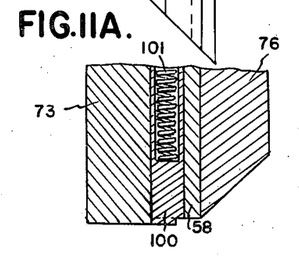
Figure 11A is a vertical sectional view through the punch assembly illustrated in Figure 11.
Figures 12, 13:
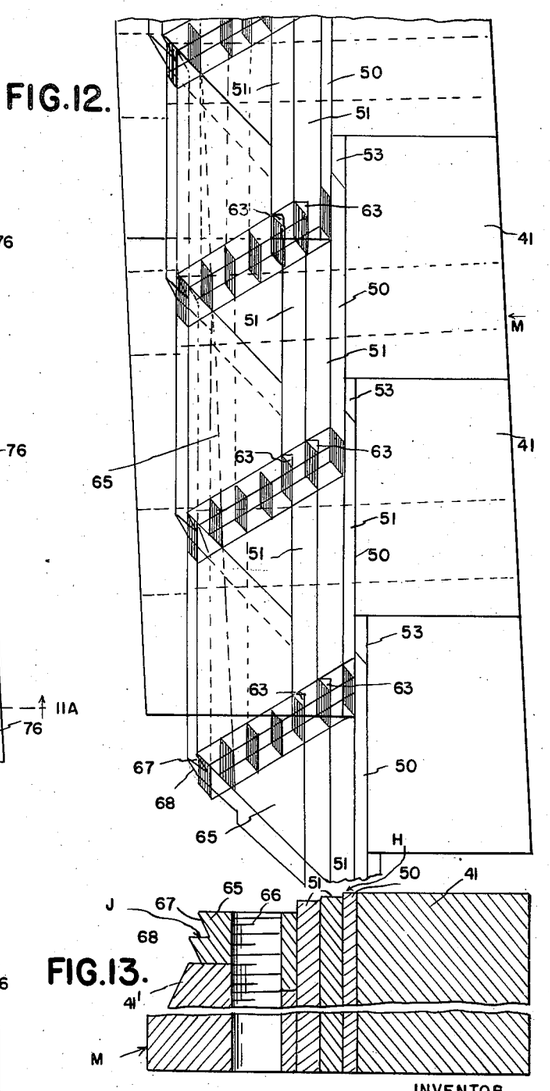
Figure 12 is an enlarged fragmentary top plan view of the folder die assembly.
Figure 13 is a vertical sectional view through the folder die assembly illustrated in Figure 12.
Figure 14:
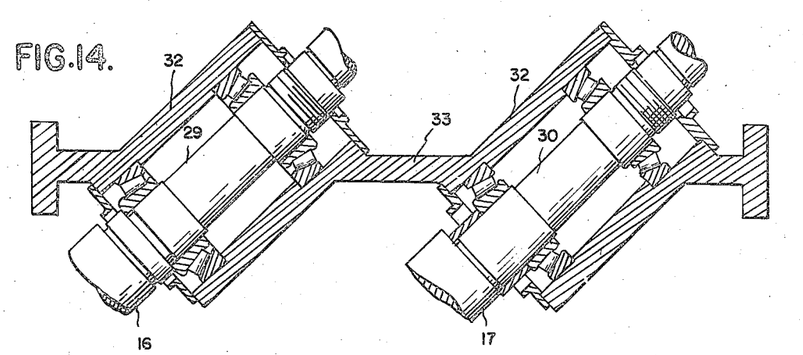
Figure 14 is a horizontal sectional view through the upright beam and bearings for the eccentric shafts for actuating the same.
Figures 15, 16:
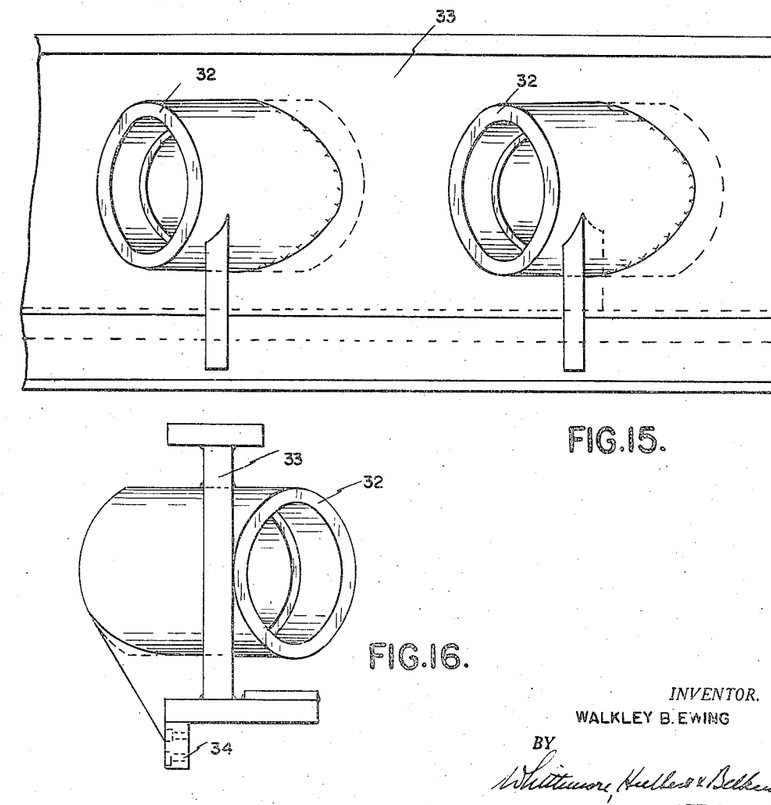
Figure 15 is a fragmentary elevational view of the upright beam and bearing sleeves illustrated in Figure 14.
Figure 16 is an end view of the structure illustrated in Figure 15.
Figure 17:
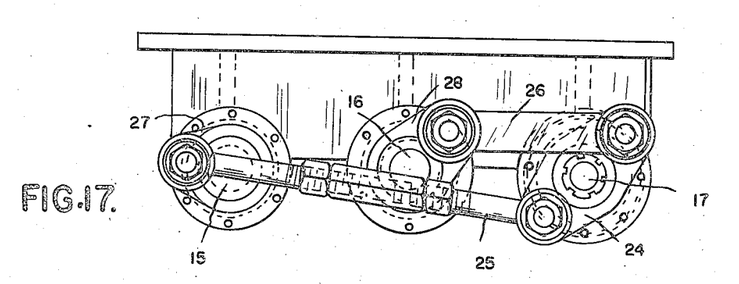
Figure 17 is an elevational view of the drive means and support therefor.
Figure 18:
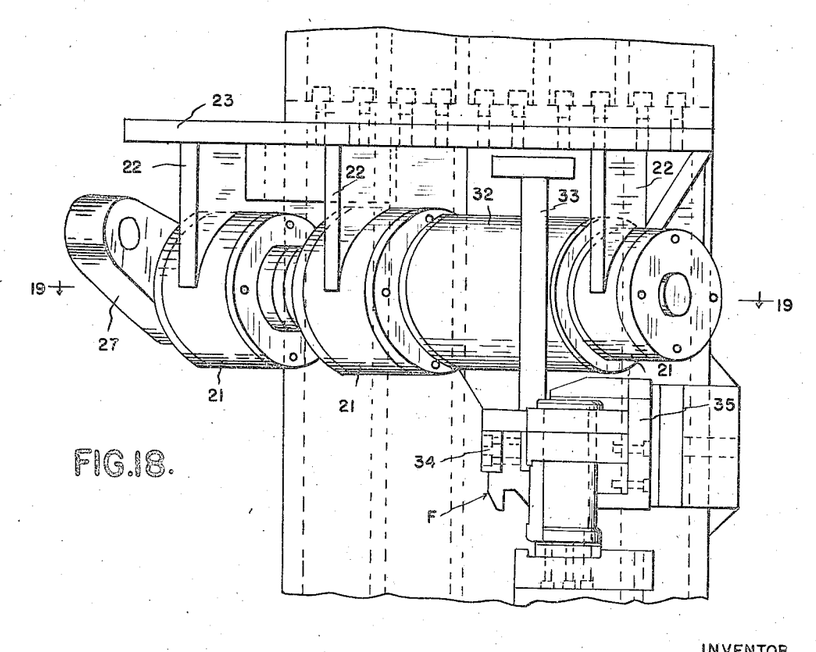
Figure 18 is an end elevation of the structure illustrated in Figure 17.

The punch assembly E includes a holder 70 having a head 71 between the base 36 of the I-beam 33 and the lower arm 35' of the yoke 35, and clamping sections 72 and 73 respectively which are carried by the head 71 within a recess 74 in the lower forward corner thereof. The slitter blades 58 of the punch assembly are disposed in upright staggered overlapping parallel relation to each other between plate-like spacers 75 and 76. Any suitable means such as bolts 77 and 78 may be used to hold together the clamping sections 72 and 73, and any suitable means such as the bolts 79, 80 and 81 respectively may be used to fasten the clamped sections 72 and 73 to the head 71.

When assembled between the sections 72 and 73, the lower working ends of the slitter blades 58 project slightly below the lower ends of the spacers 76 so as to overlap in scissor-like formation the cutting edges of the slitter blades 50 on the downward stroke of the punch holder 70 to effect the slitting operation. The lower ends of the spacers 75 and clamping sections 73 are substantially flush with each other and are disposed in lowered stepped relation to the lower working ends of the blades 58.

The folder punch assembly F comprises a die holder 82 rigid with the depending flange 34 of the I-beam 33, and folder blades 83, 84 and 85 respectively within a recess 86 in the lower end of the holder 82 are held in assembled relation therein by means of a clamping wedge 87 that is bolted or otherwise suitably connected to the holder. As shown, the blades 83 to 85 inclusive are arranged in overlapping inwardly inclined relation with the lower working ends thereof in downwardly stepped relation for mating engagement with the top and undercut portions 67 and 68 of the die blocks 65.

In the present instance, the sheet material X is fed from a power driven roll thereof (not shown) onto and along the feed bed D beneath the T-beam 14 to the slitter punch and die assemblies E and H respectively which collectively constitute the first station where the slits 8, 8' are successively formed. Such material X is then advanced to the folder punch and die assemblies F and J which collectively constitute the second station where portions of the material beside the slits are folded into inclined relation to the sheet material to form the louvers 2 and legs 4 of the sun screen.

A stripper bar 90 is movable vertically within a suitable recess 91 in the lower end of the clamping section 72 of the holder 70 for engagement with the sheet material X to partially control the advancement thereof to the two stations mentioned. As shown, this stripper bar 90 is connected to the lower end of a vertical bolt 92 slidably mounted in the clamping section 72 and having the head 93 thereof within a recess 94 in said clamping section. A coil spring 95 is sleeved upon the bolt 92 within an enlarged recess 96 in the clamping section 72 and in a similar recess 97 in the stripper bar 90 and urges the latter downwardly upon the sheet material X to hold it against such advancement. However, when the head 93 of bolt 92 engages the bottom of the recess 94 in the clamping section 72 during the upward movement of the punch holder 70, the stripper bar 90 will be raised to permit advancement of the sheet material from the first station to the second station. Cooperating with the stripper bar 90 is an insert 100 slidably mounted within the spacer 75 and normally urged downwardly by a coil spring 101 in said spacer into the path of the advancing sheet material X to limit the advance thereof after it has passed the first station.

During the initial upward movement of the holder 70, the stripper bar 90 will be held down by the spring 95 in engagement with the sheet material X to prevent it from advancing until the insert 100 in spacer 75 reaches its fully projected downward position. Thus, clearance is provided between the insert 100 and the spacers 51 to permit advancement of the sheet material but such advancement is still prevented by the stripper bar 90. During final upward movement of the punch holder 70 the stripper bar 90 is raised as aforesaid out of contact with the sheet material to permit its advancement. The sheet material will then be advanced until the forward edge of the sheet abuts the insert 100.

Upon the initial downward stroke of the holder 70 the stripper bar 90 will move downwardly to again engage and hold the sheet material against advancement. Upon the final downward stroke of the holder 70 the insert 100 will engage and be pressed upwardly into the spacer 75 by the upper end of the lowermost spacer 51. Thus, the sheet material is alternately held and released for advancement during reciprocation of the holder 70.

In use, the shafts 16 and 17 are oscillated in unison when the shaft 15 is rotated, hence the I-beam 33 carried by the eccentric portions 29 and 30 respectively of said shafts is likewise oscillated.

During the downward swinging movement of the beam 33 the folder punch assembly F carried thereby will be moved in an arc down and back relative to the cooperating folder die assembly J to effect a folding operation, and the punch assembly E will be moved vertically downward by the base 36 of the beam to cooperate with the die assembly H to effect a slitting operation. Thus, a slitting operation and a folding operation are performed simultaneously during the downward swinging movement of the beam 33.

During the upward movement of the beam 33 the folder punch assembly F will be moved in an arc upwardly and forwardly away from the die assembly J, and the punch assembly E will be moved by the lower arm 35' of the yoke 35 vertically upward away from the die assembly H. Consequently the punch assemblies E and F will be raised simultaneously. In fact, reciprocating movement is translated to the slitter punch assembly E from the oscillating beam 33 while oscillating movement is imparted directly to the folder punch assembly F by said beam.

The sheet material to be formed into sun screens is fed onto and along the feed bed D under the T-beam 14 to the stripper bar 90.

When the punch assembly E is first fully raised by the yoke 35 and beam 33 as aforesaid, the sheet material will be advanced until the forward end thereof abuts the adjacent side of the spring projected insert 100 which will serve as a temporary stop therefor, as illustrated in Figure 4a.

Upon the first downward stroke of the punch assembly E relative to the die assembly H the cooperating cutting edges of the blades 50 and 58 will overlap one another to form a slit in the sheet material, consequently the blade 50 will depress below the upper end of the blade 58 the portion of the material between the forward end thereof and the slit so formed. During this operation the stripper bar 90 is held by the spring 95 in firm engagement with the sheet material to temporarily prevent further advancement thereof on the feed bed.

When the punch assembly E is again fully raised, the sheet material will be advanced until the rear edge of the formed slit aforesaid abuts the adjacent side of the spring projected insert 100 and such advancement of the material will cause the depressed portion thereof, i. e. the portion between the forward end of the sheet and the forward edge of the formed slit, to be advanced beneath the projected insert 100.

During the next downward stroke of the punch assembly E relative to the die assembly H a second slit will be formed as aforesaid by the blades 50 and 58 in the sheet material in staggered overlapping parallel relation to the first mentioned slit, and the portion of the material between the first and second slits will be depressed below the rear edge of the second formed slit.

When the punch assembly E is again fully raised, the sheet material will be advanced until the rear edge of the second formed slit abuts the adjacent side of the spring projected insert 100, and such advancement of the material will cause the first mentioned depressed portion of the material to be advanced over the folder die J, and will cause the second mentioned depressed portion to be advanced beneath the projected insert 100.

Thus, the sheet material will be successively advanced a distance equal to the width of a depressed portion each time the punch assembly E is fully raised during vertical reciprocation thereof.

After a sixth slit is formed as aforesaid in the sheet material by the blades 50 and 58, the material will have advanced further until the first mentioned depressed portion of the material, i. e. the portion between the forward end of the material and the first slit, is positioned between the working portions 67, 68, 83, 84 and 85 respectively of the punch and die assemblies F and J.

When a seventh slit is being formed in the sheet material the punch and die elements 67, 68, 83, 84 and 85 respectively of the assemblies F and J will fold the first mentioned depressed portion of the material downward and backward to provide an inclined louver 2 and leg 4. Thereafter, during each downward stroke of the beam 33, a folding operation to produce a louver 2 and leg 4 occurs simultaneously with a slitting operation as the sheet material is advanced as aforesaid through the machine.

When a slit is formed in the sheet material, the cutting edges of the blades 50 and 58 forming the slit have a scissor-like action which causes a louver 2 to be slightly preformed by a slight displacement of the material beside said slit. Inasmuch as the beveled portions 53 and 60 respectively of the blades are opposed to one another in advance of the cutting edges of said blades when the latter are in operative working position, it will be apparent that a leg 4 is also slightly preformed during this slitting operation. In this connection it will be appreciated that the blades 50 and 58 have corresponding portions 53 and 60 respectively at opposite upright edges thereof and have cutting edges at opposite sides thereof, hence such blades may be readily reversed whenever desired to provide double life thereto. It will also be appreciated that the spring pressed insert 100 and the stripper bar 90 cooperate with each other in such a way that the sheet material may be advanced rapidly and accurately through the machine.

Thus, it will be apparent that the machine slits and folds the sheet material instead of expanding it in the ordinary sense to provide the sun screen. Moreover, the construction and arrangement of parts are such that a precise control of the angular disposition of the shaped portions of the sheet material is obtained.

One characteristic of the folder punch assembly is that it performs a parallelogram movement in which every point in the structure passes through a similar and equal arcuate path and the punch in all positions maintains its parallel relation to the die. Furthermore, the plane of movement is determined by the angle of the eccentric shafts to the direction of the slits in the sheet, while the radius of movement is determined by the eccentricity of the shafts. Both of these factors are selected with respect to the particular design of sun screen to be formed, the angle determining the obliquity of the louvers and their connecting legs while the radius is substantially equal to the length of these legs. Consequently, in the operation of the folder the louvers are successively moved downward longitudinally of the slits and rearward into contact with the folder die and in superposed relation to the louvers previously folded. There is no stretching or deformation of the sheet other than the bending of the leg portions at their point of juncture with the louver portions.

What I claim as my invention is:

1. A machine having means for including a reciprocating member for producing a slit in sheet material, means including an oscillating member for folding a portion of the sheet material beside the slit, and a common actuator for both of said members operatively connected thereto.

2. A machine for making sun screens having means including a reciprocating member for producing a slit in sheet material, means including an oscillating member for folding a portion of the sheet material beside the slit into a louver, an oscillating actuator, means for translating oscillating movement from the actuator into reciprocating movement for the reciprocating member, and means for transferring oscillating movement of said actuator directly to the folding member.

3. A machine for making sun screens having an oscillating member, means including a reciprocating member for producing slits in sheet material, means operable by the oscillating member for actuating the reciprocating member, and means including a member operable by the oscillating member for folding portions of the sheet material adjacent the slits.

4. A machine for making sun screens having a rotating shaft, two oscillating shafts operable in unison from the rotating shaft and provided with eccentrics, means including a reciprocating member for producing slits in sheet material, means including an oscillating member for folding portions of the sheet material beside said slits, and actuating means for the slitting and folding members including a member mounted upon and actuable by said eccentrics.

5. A machine for making sun screens having means for successively forming staggeredly arranged overlapping substantially parallel slits in sheet material, and oscillating means for folding the material beside said slits to provide substantially parallel inclined louvers and inclined interconnecting legs at opposite ends of said louvers, said oscillating means swinging in a plane oblique to the direction of said slits and through an arc of a radius substantially equal to the length of said legs.

6. A machine having adjacent die assemblies, a reciprocating punch movable relative to one of said assemblies to form a slit in sheet material, an oscillating punch movable relative to the other of said assemblies to fold a portion of the material beside the slit, and a common actuator for the reciprocating and oscillating punches.

7. The combination with means for slitting a sheet to form therein parallel overlapping slits, of means for folding the sheet portions between the overlapping portions of said slits about an axis oblique to the slits to form superposed louvers and connecting transversely obliquely extending legs.

8. The combination with means for successively advancing a sheet slitted to form louver portions and connecting legs, of folding means comprising an oscillatory member swinging in a plane oblique to the direction of slits whereby the connecting legs are folded about correspondingly oblique axes and the louver portions are successively moved downward longitudinally and rearward into superposed positions.

9. A machine for making sun screens comprising a reciprocatory member for forming slits in sheet material, an adjacent folding member, means for imparting to said folding member a parallelogram movement through an arc in a plane oblique to the direction of the slits, and a connection between said folding member and reciprocatory member for simultaneously actuating the latter by the former.

10. A machine for making sun screens comprising a reciprocatory member for producing slits in sheet material, a folding member adjacent to said reciprocatory member, means for actuating said folding member including a pair of parallel shafts extending in a direction oblique to the direction of the slits and having similar eccentric portions for engaging said folding member, and means for simultaneously oscillating said shafts to impart to said folding member a parallelogram arcuate movement for displacing a portion of the sheet material adjacent to a slit to form a louver thereof.

11. The combination with means for slitting a sheet to form therein parallel overlapping slits, of means for folding said sheet comprising a member for engaging a portion of the sheet on one side of a slit therein, and means for imparting to said member a parallelogram arcuate movement about axes oblique to the direction of the slits, whereby the portion of the sheet engaged by said member is displaced downward longitudinally of the slit and rearward to form a louver and the sheet portions between overlapping portions of the slits are folded at their opposite ends about said oblique axes to form connecting legs.

12. Sheet slitting means comprising oppositely facing punch and die members each including overlapping blades having spaced shearing edges and a die portion therebetween, the die portions of the two members being in registration to clamp a portion of the sheet therebetween and the shearing edges being arranged on opposite sides of said die portions to form overlapping slits.

13. Sheet slitting means comprising oppositely facing punch and die members each including a pair of shearing blades having overlapping portions, one of which is cut away to form an obliquely extending face which registers with and is parallel to the corresponding portion of the opposite member; the other blades being arranged respectively upon opposite sides of said registering portions and cooperating therewith to shear overlapping slits in said sheet with the sheared portion therebetween clamped and held from distortion by said oblique faces.

14. Sheet slitting means comprising oppositely facing punch and die members each including a series of shearing blades having successive overlapping portions, one of each being cut away to form an obliquely extending face which registers with and is parallel to the corresponding portion of the opposite member; the other blades of the series in the two members being respectively upon opposite sides of said cut away portions to form in said sheet a series of overlapping slits with the sheared portions therebetween clamped by said oblique faces to hold the same from distortion and with all of the clamped portions bent in the same direction thereby avoiding stretching of the metal.

15. Sheet slitting means comprising oppositely facing punch and die members each including a pair of shearing blades having overlapping portions, one of which is cut away to form a face extending obliquely in the plane of the blade and which registers with and is parallel to the corresponding portion of the opposite member, the intersection between each of said oblique faces and the face of the remainder of said blade being in a line oblique to the shearing edge of the blade; the other blades being arranged respectively on opposite sides of said registering portions and cooperating therewith to shear overlapping slits in said sheet with the sheared portion therebetween slightly bent about said oblique line of intersection and held from distortion by said oblique faces.

16. Sheet slitting means comprising oppositely facing punch and die members each including a series of shearing blades having successive overlapping portions one of each being cut away to form a face extending obliquely in the plane of the blade, which face registers with and is parallel to the corresponding portion of the opposite member, each of said oblique faces intersecting the face of the remainder of the blade in a line oblique to the shearing edge of the blade; the other blades of the series in the two members being respectively upon opposite sides of said cut away portions to form in said sheets a series of overlapping slits with the sheared portions therebetween slightly bent in the same direction about said oblique lines of intersection and clamped between said oblique faces to hold the same from distortion or stretching of the metal.

WALKLEY B. EWING.